United States Patent
Hiri

(12) 
(10) Patent No.: US 6,490,550 B1
(45) Date of Patent: Dec. 3, 2002

(54) SYSTEM AND METHOD FOR IP-BASED COMMUNICATION TRANSMITTING SPEECH AND SPEECH-GENERATED TEXT

(75) Inventor: Farzad Hiri, Richardson, TX (US)

(73) Assignee: Ericsson Inc., Research Triangle Park, NC (US)

(*) Notice: Subject to any disclaimer, the term of this patent is extended or adjusted under 35 U.S.C. 154(b) by 0 days.

(21) Appl. No.: 09/200,879

(22) Filed: Nov. 30, 1998

(51) Int. Cl.[7] ............................. G10L 19/00; H04L 1/22

(52) U.S. Cl. ....................................... 704/201; 704/235

(58) Field of Search ............................... 704/201, 200, 704/271, 235, 260, 270.1; 370/352

(56) References Cited

U.S. PATENT DOCUMENTS

| | | | |
|---|---|---|---|
| 4,599,612 A | * 7/1986 | Kaji et al. | 345/635 |
| 5,677,739 A | * 10/1997 | Kirkland | 348/468 |
| 5,724,410 A | * 3/1998 | Parvulescu et al. | 379/88.18 |
| 5,732,216 A | * 3/1998 | Logan et al. | 709/203 |
| 5,777,997 A | * 7/1998 | Kahn et al. | 370/493 |
| 5,956,681 A | * 9/1999 | Yamakita | 704/260 |
| 5,987,405 A | * 11/1999 | Bantz et al. | 704/220 |
| 6,026,360 A | * 2/2000 | Ono | 704/260 |
| 6,047,252 A | * 4/2000 | Kumano et al. | 704/2 |
| 6,119,078 A | * 9/2000 | Kobayakawa et al. | 704/3 |
| 6,141,341 A | * 10/2000 | Jones et al. | 370/352 |
| 6,144,991 A | * 11/2000 | England | 709/205 |
| 6,151,576 A | * 11/2000 | Warnock et al. | 704/260 |

FOREIGN PATENT DOCUMENTS

| | | |
|---|---|---|
| EP | 0 808 048 A2 | 11/1997 |
| EP | 0 847 179 A | 6/1998 |
| WO | WO 97/42728 | 11/1997 |

OTHER PUBLICATIONS

Harry Newton, "Newton's Telecom Dictionary," Flatiron Publishing, Mar. 1998, pp. 374–379, 526–528, 681, 708–709, 787, and 790.*

Microsoft Developer Network, "Using Speech Recognition", http://www.premium.microsoft.com/msdn/library/sdkdoc/dnplatf/dld/s2c8.htm, p. 1.

Microsoft Deveoper Network, "Overview of Speech–Recognition Objects", http://www.premium.microsoft.com/msdn/library/sdkdoc/dnplatf/dld/s296.htm, pp. 1–2.

Microsoft Deveoper Network, "Low–Level Speech Recognition", http://www.premium.microsoft.com/msdn/library/sdkdoc/dnplatf/d24/s1137.htm, p. 1.

(List continued on next page.)

*Primary Examiner*—Marsha D. Banks-Harold
*Assistant Examiner*—Donald L. Storm
(74) *Attorney, Agent, or Firm*—Jenkens & Gilchrist, P.C.

(57) ABSTRACT

A system and method for IP-based telephone communication utilizing speech-generated text is disclosed. An embodiment of the present invention includes an interface to the Internet for sending and receiving voice and video signals. In addition, the embodiment generates text signals corresponding to voice signals generated by the user. A transmission signal is generated from the text signals and the voice signals for transmission over the Internet. Further, the embodiment of the present invention includes an application which is capable of receiving video and/or speech-generated data transmitted by another device, and concurrently displaying the speech-generated data and video to a user. The speech-generated data may be converted to an audio signal and applied to a speaker concurrently with the video and speech-generated data. In this way, a user is capable of easily communicating speech-generated information to another user during periods of voice signal loss.

10 Claims, 4 Drawing Sheets

OTHER PUBLICATIONS

Microsoft Deveoper Network, "Speech Recognition Enumerator", http://www.premium.microsoft.com/msdn/library/sdkdoc/dnplatf/dld/sf27.htm, p. 1.

Andrew Hunt, "SAPI:Microsoft Windows Speech API", http://www.ri.cmu.edu/comp.speech/Section1/Interfaces/ms.speech.api.html p. 1 (1993).

Andrew Hunt, "Microsoft Speech Recognition", http://www.ri.cmu.edu/comp.speech/Section6/Recognition/microsoft.html p. 1 (1993).

Andrew Hunt, "AT&T Watson Speech recognition", http://www.ri.cmu.edu/comp.speech/Section6/Recognition/att.html p. 1 (1993).

Microsoft Corp., "Speech Technology", http://www.research.microsoft.com/research.srg/faq.htm, pp. 1–7.

Andrew Hunt, "Cambridge Voice for Windows", http://www.ri.cmu.edu/comp.speech/Section6/Recognition/cambridge.voice.html, p. 1 (1996).

Andrew Hunt, "Custom Voice and Custom Telephone: A&G Graphics Interface Inc.", http://www.ri.cmu.edu/comp.speech/Section6/Recognition/custom.voice.html p. 1 (1996).

Andrew Hunt, "VoiceAssist for Windows from Creative Labs, Inc.", http://www.ri.cmu.edu/comp.speech/Section6/Recognition/voiceassist.html p. 1 (1996).

PCT; Standard International Search Report for PCT/US99/28215; Apr. 10, 2000.

* cited by examiner

SYSTEM AND METHOD FOR IP-BASED COMMUNICATION TRANSMITTING SPEECH AND SPEECH-GENERATED TEXT

BACKGROUND OF THE INVENTION

1. Technical Field of the Invention

The present invention relates, in general, to improved IP-based communication and, particularly, to a system and method for providing speech-generated text to IP-based telephone communication.

2. Background and Objects of the Invention

There is currently a movement towards enhancing the capabilities of computer networks, such as the Internet, to support traditional telephony operations. The goal is to provide quality voice communications over the packetized Internet. This capability is often referred to a voice over Internet Protocol (VoIP). With the current Internet, for example, VoIP can provide acceptable voice communications at a greatly reduced cost to the user, when compared to traditional telephone tolls.

Recently, IP-based telephone systems have become capable of providing video along with voice communication. Standard personal computer (PC) plug-in hardware, such as Picturephone by 3com, and various software applications provided for Internet telephony, such as CU-SeeMe software by White Pine and software by Vocaltech and Microsoft, allow transport of both voice and image data across the Internet. In particular, such systems typically include a microphone, a speaker and a PC plug-in sound card for providing audio data to a user's PC, and a video camera and a PC plug-in video capture card for providing video data thereto. Upon the establishment of a connection between two or more PCS over the Internet, the audio and video data generated in one PC is packetized and transported over the Internet for display on the other PC, such as within a browser framework. In this way, PC users may view each other while simultaneously speaking to each other.

Existing IP-based telephone systems having video communication capability typically allow a PC user to communicate text to the other PC user in communication therewith. Text entered via the keyboard of a first PC may be transported with the audio and video data over the Internet and displayed as text in a browser window on another PC in communication with the first PC.

These IP-based telephone systems are not without shortcomings. For instance, VoIP usually provides a markedly reduced quality of service relative to conventional long distance telephone services. Poorer voice quality, intermittent fading, and other interruptions are commonly encountered, especially during international calls.

In response to periods of reduced quality of service, callers utilizing IP-based telephone systems frustratingly resort to communicating with typed text instead of attempting to communicate with voice. To further compound the problem, typed text data is transported at a slower rate than voice data. As a result, it is oftentimes quite difficult to engage in communication when one caller is providing voice data and the other caller is providing typed text data, due to the data transmission of voice and typed text being out of synch.

In the context of IP-based telephone systems having video communication capabilities, having to communicate with typed text during periods of reduced quality of voice communication may result in a relatively inexperienced typist being forced to look away from the video display when entering text, thereby reducing the value in being provided a real-time video display of the other caller. As a result, there is a need for an IP-based telephone system which addresses the inherent problems associated with VoIP telephone communication.

It is an object of the present invention to provide an IP-based telephone system which selectively automatically provides text during periods of substandard voice communication.

Another object of the present invention is to provide an IP-based telephone system which allows a caller to view received video data while concurrently transmitting video and speech-generated data.

SUMMARY OF THE INVENTION

The present invention overcomes the shortcomings in the above-identified systems and satisfies a significant need for an IP-based telephone system having enhanced and easily utilized communication features.

According to a first embodiment of the present invention, there is provided an improved IP-based telephone system. The telephone system includes a combination of hardware, software and/or firmware employed in association with a conventional PC in order to perform VoIP communication. A video capture card communicatively connected to a PC preferably receives video input data from a video source as well as from a VoIP transmission. A sound card communicatively connected to the PC preferably receives audio input from a microphone as well as from a VoIP transmission. A speech recognition device operatively associated with the PC preferably receives the microphone audio data, recognizes speech patterns therein and generates text data representing the recognized speech patterns. The generated text data is included with the microphone-provided audio data and the video camera-generated video data for transport over the Internet to another PC. In this way, a PC user may communicate video, voice and voice-generated text data to another PC user.

The present system preferably further includes an application which receives VoIP video data and speech-generated text data which were transmitted by another PC. In the event the other PC transmits a signal or set of signals having video data, audio/voice data and speech-generated text data, the application preferably displays the video data and produces audible signals from the audio/voice data using a speaker. In addition, the IP application preferably presents the speech-generated text concurrently with the displayed video data. In this way, the PC user is able to read the speech-generated text while viewing the video data during periods when the VoIP audio signal transmission falters.

BRIEF DESCRIPTION OF THE DRAWINGS

A more complete understanding of the system and method of the present invention may be obtained by reference to the following Detailed Description when taken in conjunction with the accompanying Drawings wherein.

DETAILED DESCRIPTION OF THE PREFERRED EXEMPLARY EMBODIMENTS

The present invention will now be described more fully hereinafter with reference to the accompanying drawings in which a preferred embodiment of the invention is shown. This invention may, however, be embodied in many different forms and should not be construed as being limited to the embodiment set forth herein. Rather, the embodiment is provided so that this disclosure will be thorough and complete, and will fully convey the scope of the invention to those skilled in the art.

Figure 1:
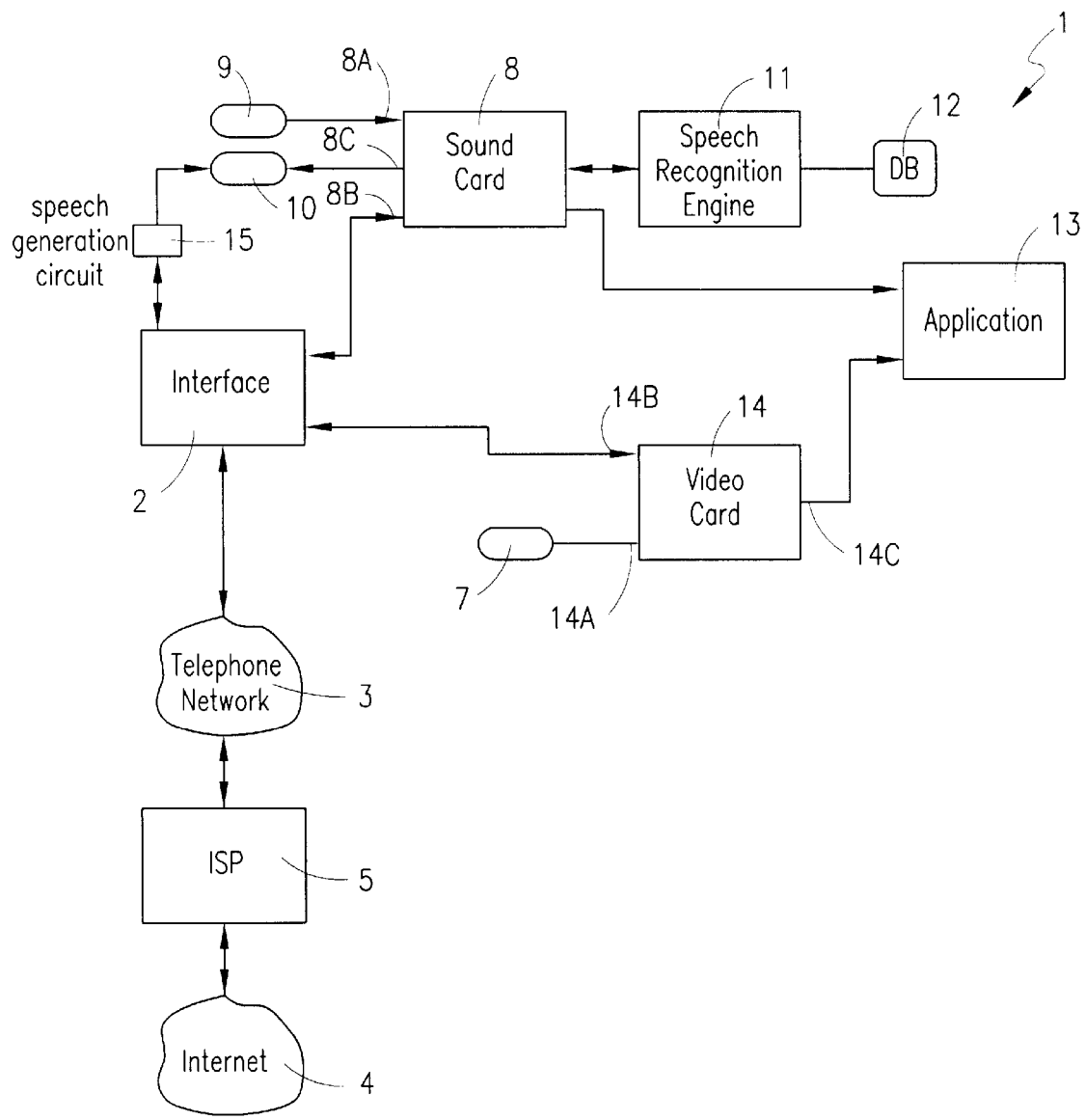
FIG. 1 is a functional block diagram of the present invention.
Figure 2:
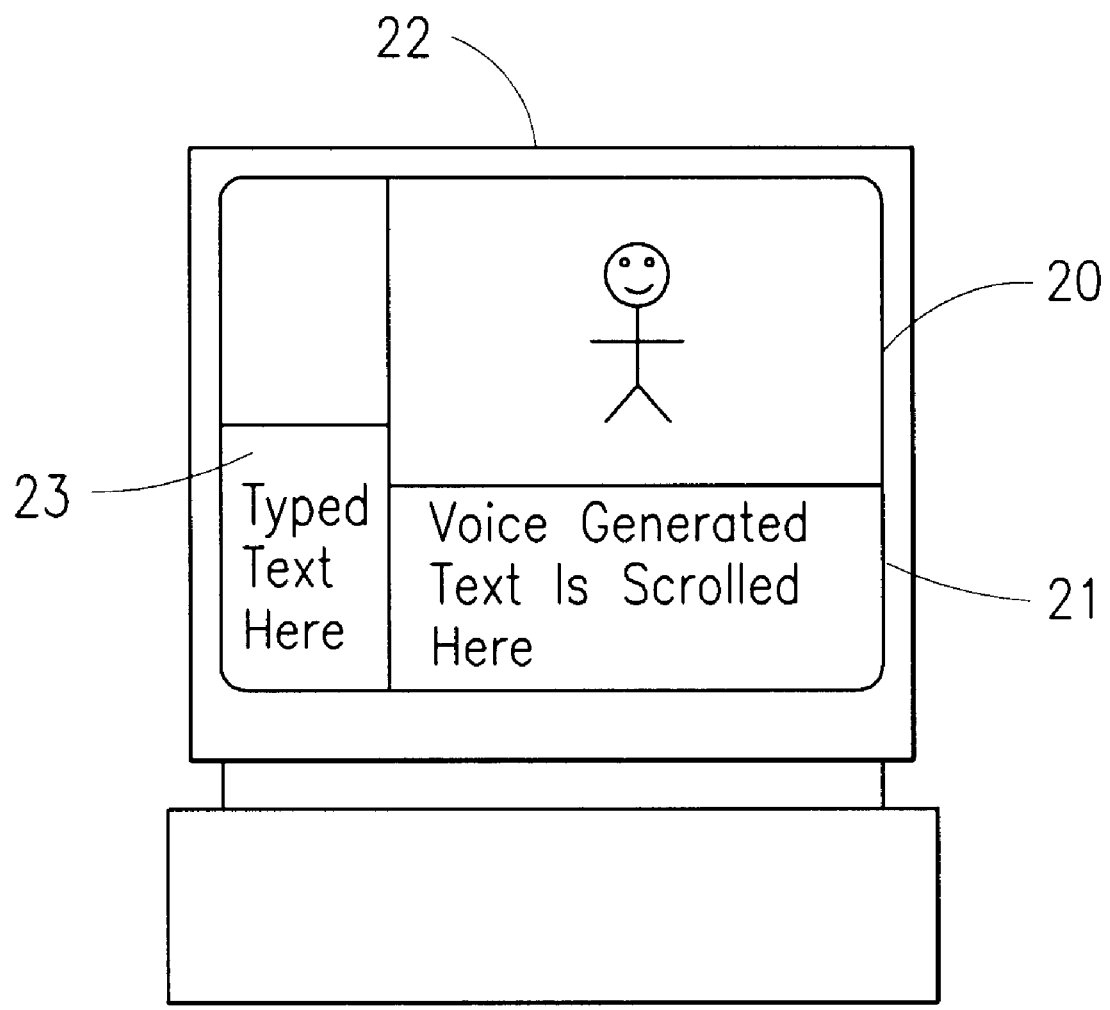
FIG. 2 is the resulting display generated by the present invention.

Referring to FIGS. 1 and 2, there is shown an improved IP-based telephone system 1 according to the present invention. Telephone system 1 preferably includes hardware, software and/or firmware operatively associated with a PC so as to provide VoIP communication having enhanced features. Telephone system 1 preferably includes an interface 2 for connection to a telephone network 3, such as a public switched telephone network (PSTN). Interface 2 preferably includes a modem (not shown) or other interface circuitry for suitably transmitting signals generated by telephone system 1 and receiving signals transmitted thereto. Interface 2 is utilized for accessing Internet 4 via Internet service provider (ISP) 5. Consequently, interface 2 may include circuitry for converting data, such as voice and video data, into packet switched or packetized signals for transmission over Internet 4.

Telephone system 1 preferably further includes one or more devices for generating voice data signals relating to the voice of the PC user for transport over Internet 4 and for receiving voice data signals therefrom for presentation to the PC user. System 1 may include a sound card 8 having a first port 8A for receiving voice data generated by microphone 9 and circuitry for suitably conditioning the received voice data for Internet transmission. Sound card 8 further includes a second port 8B for transmitting the conditioned voice data signals for transport over Internet 4 and for receiving VoIP signals therefrom. Circuitry for conditioning the received VoIP signals is included in sound card 8 for applying to speaker(s) 10 via sound card port 8C. It is understood that sound card 8 may be a PC plug-in device or another hardware/firmware device associated with a PC.

As stated above, it is desirable to be able to communicate to another caller during periods of voice signal loss. Accordingly, the present invention includes a device for selectively generating text data from a received VoIP signal. In a preferred embodiment of the invention, the text generating device is a speech recognition engine 11. Speech recognition engine 11 preferably is an object which receives from sound card 8 the audio signal generated by microphone 9, processes the audio signal using grammar database object 12 and generates text data corresponding to the processed audio signal. The generated text data is then available for transmission with the audio signal for transmission over Internet 4. When the transmitted audio and corresponding text signal is received at the receiving PC, the audio signal and the text data corresponding thereto are presented to the user thereof. By sending both voice and corresponding text to the receiving caller, the sending caller is able to fully and clearly communicate therewith.

As previously mentioned, sound card 8 receives and conditions a VoIP signal transmitted over Internet 4 by another caller, and applies the VoIP signal to speaker 10. In order for a caller to discern text data generated by a speech engine 11 at another PC and transmitted thereby over Internet 4, telephone system 1 preferably includes an application 13 which displays the text data to the PC user. Application 13 preferably displays the text data substantially in concert with the application of its corresponding audio signal to speaker 10. By way of one example, application 13 displays the text data as scrolling text in a window within a browser framework. As a result, the PC user at the receiving PC is able to both hear and see the voice message generated by the transmitting PC. Significantly, in the event the voice data becomes temporarily distorted, the PC user at the receiving PC is still able to discern the voice message by simply reading the text as the text is displayed on the receiving PC.

In addition to communicating voice and voice-generated text, telephone system 1 may preferably further include the capability to communicate video between two or more callers over Internet 4. To this end, telephone system 1 may include a video capture card 14 having a first port 14A and corresponding receiver for receiving video data from a video source 7, such as a video camera, and a second port 14B which is coupled to interface 2. Video data captured by video source 7 is transmitted to video capture card 14 and suitably conditioned for sending over Internet 4. Sound card 8, speech engine 11 and video capture card 14 are preferably synchronized so that voice signals, voice-generated text and video signals are substantially concurrently presented to the user at the receiving PC.

Video capture card 14 preferably further includes a receiver coupled to port 14B for receiving video signals transmitted by another PC over Internet 2, circuitry for conditioning and/or extracting video data from the received video signals, and a third port 14C for sending the conditioned video data to application 13. Upon reception by application 13, application 13 preferably concurrently displays to the PC user the conditioned video corresponding to the video signal and images corresponding to the voice-generated text. In a preferred embodiment, the displayed video may be presented in one window 20 and the voice-generated text images may presented in another window 21 on PC monitor 22, as shown in FIG. 2. This arrangement may be in accordance with a browser format generated by application 13. Alternatively, both the displayed video and the voice-generated text images may be presented in the same window on monitor 22. Further, application 13 may present typed text generated from a sending PC user using the keyboard of the sending PC. The typed text may be presented in a third window 23 on monitor 22.

The present invention may further include a device which receives a text signal from a sending PC and generates audible speech corresponding thereto. The device preferably comprises speech generation circuitry 15 which receives as its input text data, such as typed text, and generates audio signals for application to speaker 10. In this way, a speech-impaired individual may orally communicate to another PC user by typing text into the individual's PC keyboard.

Figure 3:
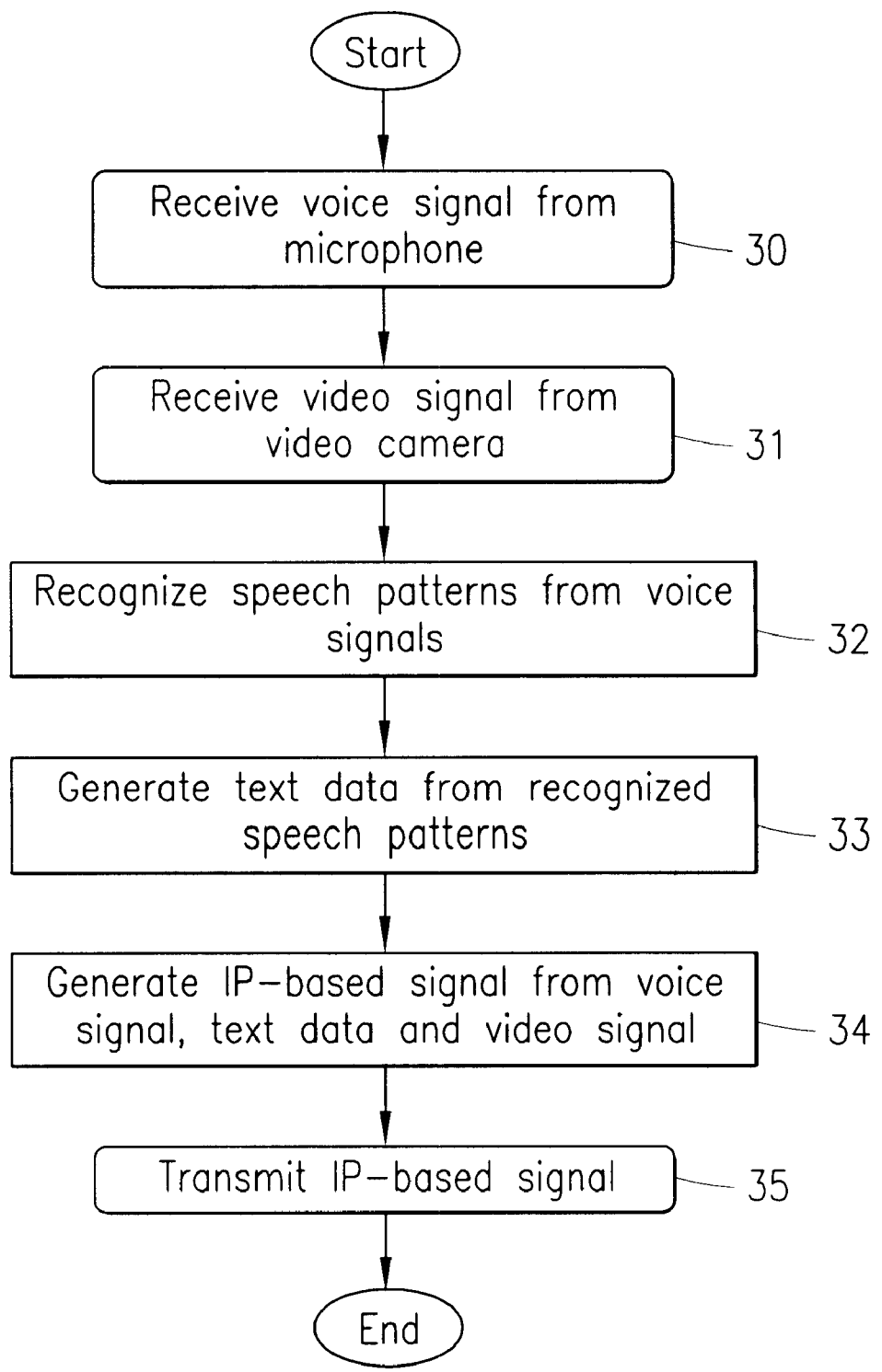
FIG. 3 is a flow chart illustrating the transmission of VoIP data according to the present invention.

The operation of the present invention in transmitting information to another PC will now be described with reference to FIG. 3. In response to the PC user speaking into microphone 9, a voice signal is generated which is received by sound card 8 at step 30. Video camera 7 generates a video signal which is received by video capture card 14 at step 31. The video signal is generated substantially simultaneously with the generated voice signal such that sound card 8 receives the voice signal at the substantially the same time as video capture card 14 receives the video signal. Next, speech engine 11 processes the voice data at step 32 to recognize speech patterns therein. Speech engine 11 utilizes grammar database object 12 at step 33 to develop text data corresponding to the recognized speech patterns. Thereafter, sound card 8, video capture card 14 and interface 2 generates an IP-based signal at step 34 using the received voice and video signals as well as the generated text data. Subsequent to its generation, the IP-based signal is transmitted at step 35 for transport over Internet 4 to a receiving PC.

Figure 4:
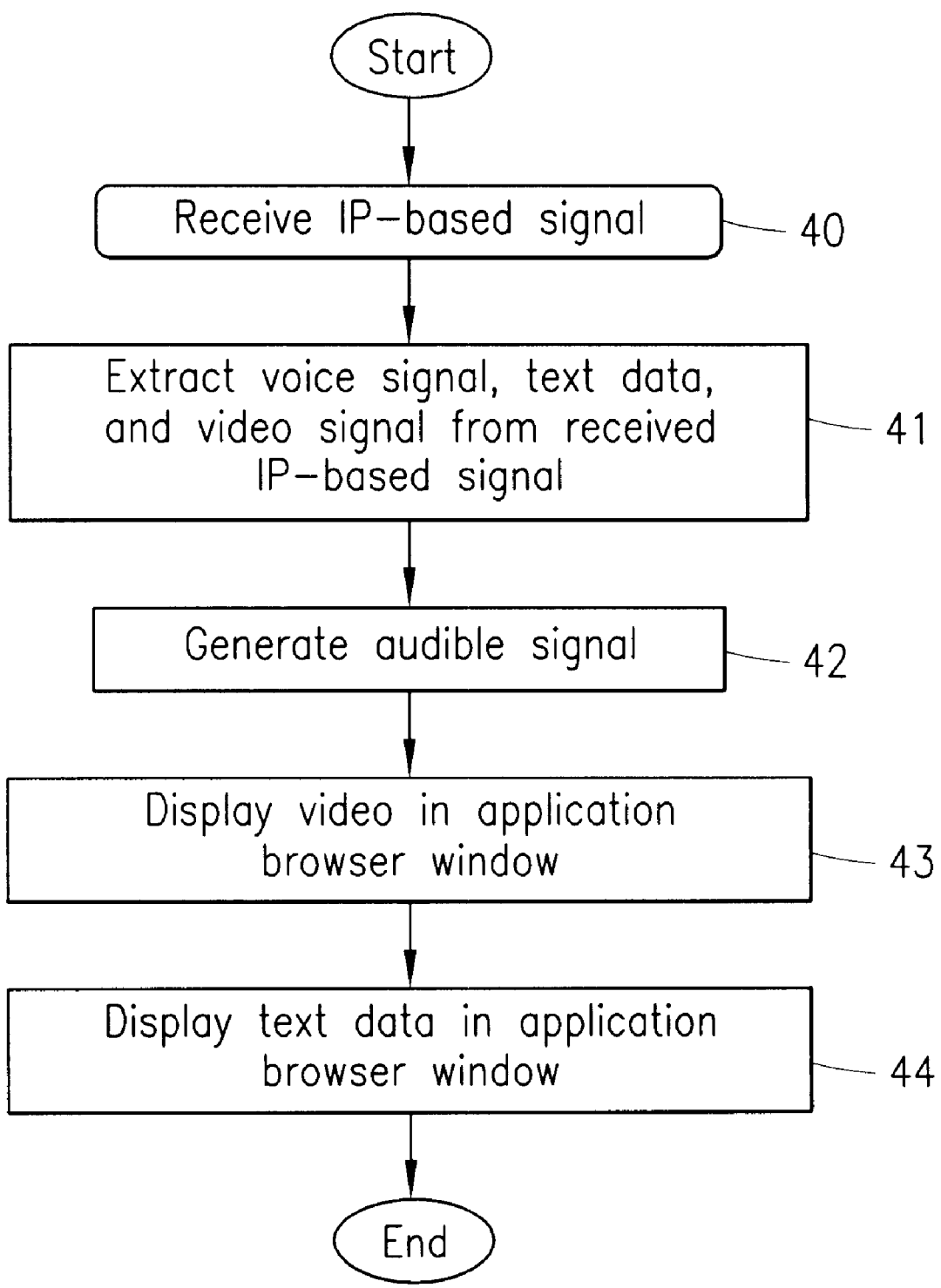
FIG. 4 is a flow chart illustrating the reception of VoIP data according to the present invention.

The operation of the present invention in receiving information from another PC will now be described with reference to FIG. 4. Initially, telephone system 1 receives an IP-based signal from another PC (the sending PC) at step 40. Next, interface 2, sound card 8 and video capture card 14 extract the voice signal, video signal and speech-generated text data from the received IP-based signal (step 41). Thereafter, a series of three operations are executed substantially simultaneously. The extracted voice signal is applied to speaker 10 at step 42 to generate audible signals based thereon. The video data and the speech-generated text data are conditioned and displayed to the PC user (the user at the receiving PC) at steps 43 and 44, respectively. In a preferred embodiment, the video data is displayed in one browser window and the text data displayed in a second browser window (FIG. 2). Alternatively, the video and text data are displayed in the same browser window. The text data is preferably displayed as scrolling text, but alternatively the text data may be displayed and updated in other forms.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An IP-based telephone system, comprising:

a first receiver for receiving an audio signal from an audio source;

first circuitry for generating a first packet switched signal from said audio signal received by said first receiver;

a transmitter for transmitting said first packet switched signal;

a speaker;

a second receiver for receiving a second packet switched signal having an audio text signal and a typed text signal therein;

a speech generation circuit for generating a second audio signal from the typed text signal and applying the second audio signal to the speaker; and a text application for displaying a plurality of text images corresponding to said audio text signal in substantial synchronicity with the second audio signal being applied to the speaker.

2. The IP-based telephone system of claim 1, wherein said second receiver is capable of receiving a third packet switched signal including a third audio signal, said IP-based telephone system further comprising a speaker and circuitry for transmitting said third audio signal to said speaker.

3. The IP-based telephone system of claim 1, wherein said second packet switched signal includes video data, said text application concurrently displaying said video data and said audio text signal to a system user.

4. The IP-based telephone system of claim 1, further comprising:

a third receiver, in communication with said first circuitry, for receiving video data from a video device, said first packet switched signal comprising said audio signal and said video data generated by the video device.

5. A method for communicating over the Internet, said method comprising the steps of:

receiving an audio signal from an audio source;

generating a first Internet protocol (IP) based signal from said received audio signal;

transmitting the first IP-based signal;

receiving a second IP-based signal having an audio text signal and a typed text signal therein;

generating an audible signal based upon the typed text signal; and displaying text images corresponding to said audio text signal in substantial synchronicity with the generating of the audible signal.

6. The method of claim 4, further comprising the steps of:

receiving a third IP-based signal having a second audio signal and a text signal;

displaying text images corresponding to the text signal; and transmitting said second audio signal to a speaker in substantial synchronicity with the displaying of the text images.

7. The method of claim 5, wherein said second IP-based signal includes video data, and said method further comprises the step of:

displaying said video data and said audio text signal corresponding to said second IP-based signal.

8. A telephone system, comprising:

a first receiver for receiving a packetized signal;

circuitry for extracting a first text signal and a second text signal from the packetized signal;

a display component, an application for substantially concurrently displaying the first and second text signals on the display component;

a second receiver for receiving an audio signal and generating a third text signal therefrom;

an interface for converting the audio signal and the third text signal into a second packetized signal; and a transmitter for transmitting the second packetized signal over a packet switched network.

9. The system of claim 8, wherein:

the application displays the first and second text signals in separate windows on the display component.

10. The system of claim 8, wherein:

the circuitry selectively extracts a video signal from the packetized signal; and the application displays the video signal on the display component substantially concurrently with the display of the first and second text signals.

* * * * *

UNITED STATES PATENT AND TRADEMARK OFFICE
CERTIFICATE OF CORRECTION

PATENT NO.     : 6,490,550 B2
DATED          : December 3, 2002
INVENTOR(S)    : Farzad Hiri It is certified that error appears in the above-identified patent and that said Letters Patent is hereby corrected as shown below:

<u>Column 6,</u>
Line 40, replace "a display component," with -- a display component;" --

Signed and Sealed this

Fifteenth Day of July, 2003

JAMES E. ROGAN
*Director of the United States Patent and Trademark Office*